US009277297B2

(12) United States Patent
Mason, Jr. et al.

(10) Patent No.: US 9,277,297 B2
(45) Date of Patent: Mar. 1, 2016

(54) TEST MODE SUPPORT FOR METERING ACCURACY TESTS

(75) Inventors: Robert T. Mason, Jr., Raleigh, NC (US); Andrew J. Borleske, Garner, NC (US); Keith D. Richeson, Cary, NC (US)

(73) Assignee: Elster Solutions, LLC, Raleigh, NC (US)

( * ) Notice: Subject to any disclaimer, the term of this patent is extended or adjusted under 35 U.S.C. 154(b) by 864 days.

(21) Appl. No.: 13/357,225

(22) Filed: Jan. 24, 2012

(65) Prior Publication Data

US 2012/0188093 A1     Jul. 26, 2012

Related U.S. Application Data

(60) Provisional application No. 61/435,483, filed on Jan. 24, 2011.

(51) Int. Cl.
*G08B 23/00* (2006.01)
*H04Q 9/00* (2006.01)

(52) U.S. Cl.
CPC *H04Q 9/00* (2013.01); *G08B 23/00* (2013.01); *H04Q 2209/60* (2013.01)

(58) Field of Classification Search
CPC ...... G01D 4/006; G01D 4/004; H04W 24/10; H04W 52/0219; H04W 4/00; H04L 67/12; G06F 11/2041; G06F 11/2043; G06F 11/2097; H04Q 9/00; H04Q 9/02; H04Q 9/04
USPC ............... 340/870.01, 870.02; 370/328, 329; 709/223, 224, 245, 239, 238, 240, 250
See application file for complete search history.

(56) References Cited

U.S. PATENT DOCUMENTS

| | | | |
|---|---|---|---|
| 8,145,756 B2* | 3/2012 | Eldar et al. | 709/225 |
| 2006/0071811 A1 | 4/2006 | Christopher et al. | |
| 2008/0219210 A1* | 9/2008 | Shuey et al. | 370/329 |
| 2010/0296515 A1* | 11/2010 | Kishi et al. | 370/395.53 |

OTHER PUBLICATIONS

New Zealand Patent Application No. 597784: Examination Report dated Jan. 27, 2012, 2 pages.

* cited by examiner

*Primary Examiner* — Fekadeselassie Girma
*Assistant Examiner* — Mancil Littlejohn, Jr.
(74) *Attorney, Agent, or Firm* — Baker & Hostetler LLP

(57) ABSTRACT

A metering device may be configured to communicate with other devices on a plurality of metering communication networks. To enable such communications across various networks, the metering communication device may use an active utility identifier corresponding to the metering network in which it is actively communicating. The active utility identifier may be changed to a valid utility identifier corresponding to another metering network and which may be associated with the metering communication device itself. The metering communication device may use the changed active utility identifier to communicate with other devices on the other metering network having the valid utility identifier. For example, the metering communication device may change the active utility identifier to enable communication a test network from a production network, a production network to a test network, or a first test network to a second test network.

18 Claims, 6 Drawing Sheets

| Length | SrcAddr | DestAddr | RptPath | Data (payload) |

Figure 3C outbound packet

| Length | SrcAddr | DestAddr | RptAddr | Data (payload) |

Figure 3D inbound packet

TEST MODE SUPPORT FOR METERING ACCURACY TESTS

CROSS REFERENCE TO RELATED APPLICATIONS

This application claims the benefit of U.S. Provisional Patent Application Ser. No. 61/435,483, filed Jan. 24, 2011, the contents of which are hereby incorporated by reference in their entirety.

BACKGROUND

Utilities may use communication systems to read data from electricity, water, and/or gas meters. These communication systems and meters may be installed at customer locations and used to measure consumption and other parameters to determine a customer's monthly bill.

Historically, these metering devices are installed in the field and they are left in the field for the life of the meter, typically 15-25 years. With the growth of communication systems and smart meters, functionality may be downloaded to the meters via remote firmware upgrades. With this capability, utilities may setup a test system where new firmware functionality may be tested and verified before being deployed to a production system used for billing purposes. This has forced utilities to order different sets of equipment, one set with a network identifier for the production system and one or more sets with a network identifier for a test system or systems.

Utilities have also historically performed metering accuracy tests on the various quantities that can be measured by an electricity meter. With the proliferation of radio communications, the radio frequency energy generated from the communication module may have undesired influence on other circuitry in the electricity meter.

SUMMARY OF THE INVENTION

Various techniques for supporting metering accuracy tests are disclosed herein, including a method for programming a communication device, configured to operate in a metering network, from an active utility identifier to a production utility identifier or a test utility identifier, and a method for evaluating an impact of radio modes while performing a metering accuracy test on a communication device. Systems and apparatuses for carrying out these methods are also disclosed.

Exemplary embodiments are directed to methods and devices for communicating in a metering network. A metering communication device may receive an active (e.g., present) utility identifier of the metering communication device that corresponds to a metering network. For example, the active utility identifier may correspond to a production network or a test network. In an embodiment, the active utility identifier of the metering communication device is changed to a received valid utility identifier associated with the metering communication device. The received valid utility identifier may be one of one or more valid utility identifiers that enable the metering communication device to communicate on another metering network. For example, the metering communication device may communicate with other devices having the valid utility identifier, and the valid utility identifier may correspond to another metering network, such as a production network or a test network. Embodiments also may operate the metering communication device in one or more radio test modes while performing one or more metering accuracy tests on the metering communication device.

An exemplary embodiment is directed to a metering communication device. The metering communication device comprises a transceiver configured to transmit an active utility identifier to a plurality of metering networks. For example, the transceiver may transmit radio signals in a production network and/or a test network. The metering communication device may further comprise a processor and a memory. The processor may be in electrical communication with the transceiver and the memory. The memory may be configured to store an active utility identifier and a utility configuration table. The active utility identifier may be used for communicating in an active metering network of the plurality of metering networks. The utility configuration table may include one or more valid utility identifiers for communicating in other metering networks. The processor may be configured to change the active utility identifier of the metering communication device to a valid utility identifier of the one or more valid utility identifiers associated with the metering device. The changed active utility identifier may enable the metering communication device to communicate with another metering network in the plurality of metering networks. The transceiver may be further configured to operate in one or more radio test modes. While the transceiver operates in the one or more radio test modes, the processor may be further configured to perform one or more metering accuracy tests on the metering communication device.

According to another embodiment, a computer-readable storage medium is disclosed. The computer-readable storage medium may store computer-executable instructions for performing steps in a method. The method may comprise receiving an active utility identifier of the metering communication device. The active utility identifier may correspond to a metering network. The metering communication device may communicate with one or more devices on the metering network having the active utility identifier. One or more valid utility identifiers associated with the metering communication device may be received. The one or more valid utility identifiers may enable the metering communication device to communicate on another metering network. The computer-executable instructions may change the active utility identifier of the metering communication device to a valid utility identifier. The metering communication device, using the changed active utility identifier, may communicate with one or more devices on the other meting network having the valid utility identifier.

Various embodiments may realize certain advantages. For example, changing a utility identifier of a metering communication device may allow the metering communication device to operate in a production network and/or a test network. Additionally, embodiments may allow a metering communication device to operate in a radio test mode while performing metering accuracy tests. Accordingly, embodiments may have increased flexibility and efficiency.

Other features and advantages of the described embodiments may become apparent from the following detailed description and accompanying drawings.

BRIEF DESCRIPTION OF THE DRAWINGS

The foregoing summary, as well as the following detailed description, is better understood when read in conjunction with the appended drawings. Exemplary embodiments further described herein are illustrated in FIGS. 1-4. However, it will be understood that the invention is not limited to the specific embodiments disclosed. In the drawings:

FIG. 3C illustrates one embodiment of an outbound data packet format of the metering communication system illustrated in FIGS. 1, 2, 3A and 3B, and FIG. 3D illustrates one embodiment of an inbound data packet format.

DETAILED DESCRIPTION

Figure 1:
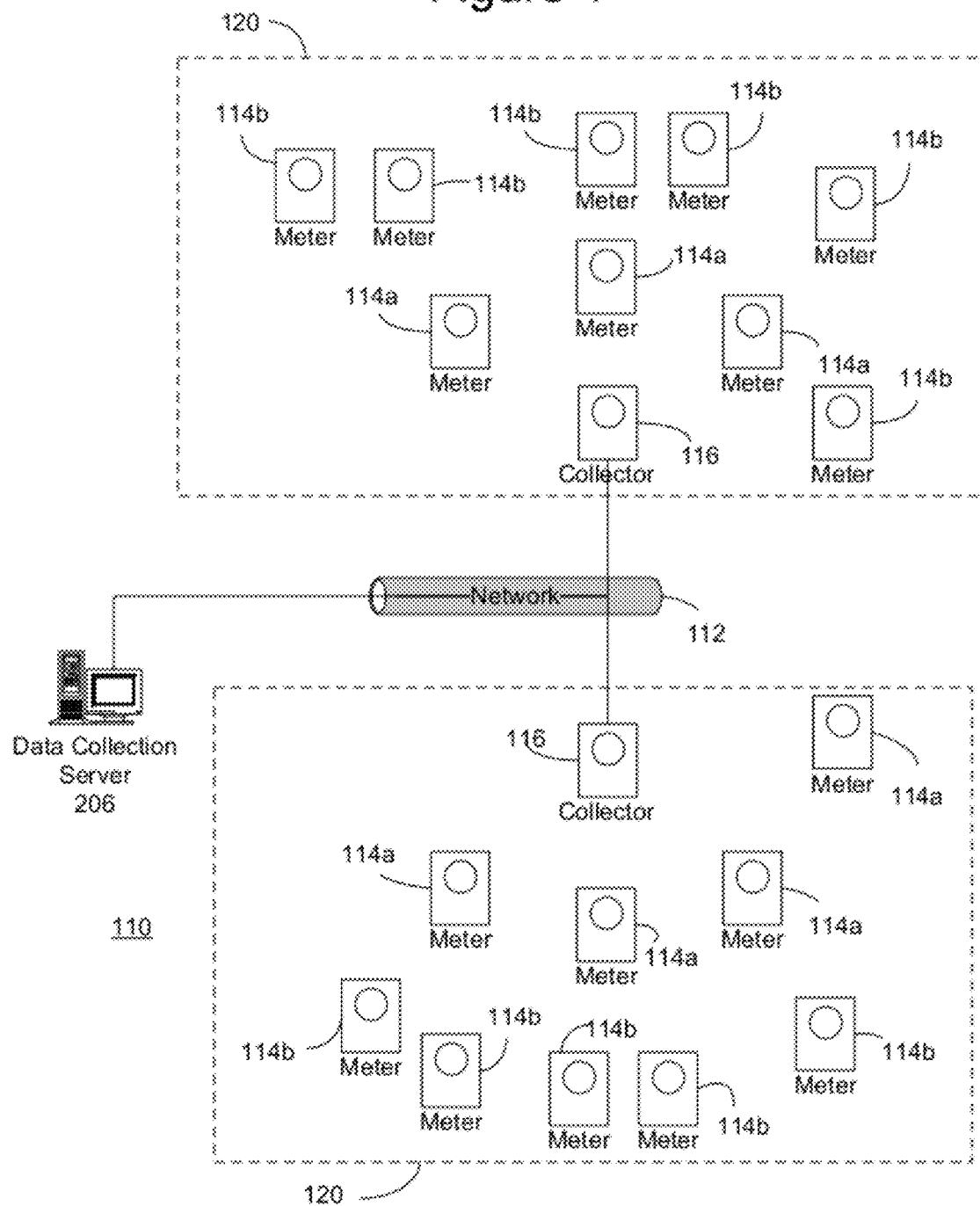
FIG. 1 is a diagram of an exemplary metering communication system employing wireless networking.

Exemplary embodiments of systems, methods and apparatus for enabling metering communication devices to be used for test purposes and/or productions purposes are provided herein. It will be understood that the invention is not limited to the specific embodiments described herein. While certain details have been provided to illustrate the embodiments described herein, it is understood that the invention may be practiced without those specific details. Acronyms and other terms may be used in the following description, however they are not intended to limit the scope of the invention as defined by the appended claims.

The systems, methods and apparatus described herein enable communication devices in a utility system to support metering accuracy tests. For example, a utility may change a network identifier from an active utility identifier to a production utility identifier or a test utility identifier. According to another example, an impact of radio modes may be evaluated while performing one or more metering accuracy tests on a communication device.

One example of a metering communication system 110 in which the systems, methods, and apparatus described herein may be employed is illustrated in FIGS. 1, 2, and 3A-D. The description given herein with respect to those figures is for exemplary purposes only and is not intended in any way to limit the scope of potential embodiments.

System 110 comprises a plurality of metering communication devices, or "meters" 114, which may be operable to sense and record consumption or usage of a service or commodity such as, for example, electricity, water, and/or gas. Meters 114 may be located at customer premises such as, for example, a home or place of business. Meters 114 may comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly. Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Solutions, LLC and marketed under the trade name REX.

System 110 further comprises collectors 116. In one embodiment, collectors 116 are also meters operable to detect and record usage of a service or commodity such as, for example, electricity, water, and/or gas. In addition, collectors 116 may be operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 may communicate with and amongst one another using any one of several wireless techniques such as, for example, frequency hopping spread spectrum (FHSS) and/or direct sequence spread spectrum (DSSS). Collectors 116 are also sometimes referred to as "gatekeepers."

A collector 116 and the meters 114 with which it communicates may define a subnet or local area network (LAN) 120 of system 110. In one embodiment, each subnet or LAN may define a controlled, wireless mesh network with the collector 116 (gatekeeper) of that LAN effectively controlling the mesh network. Further details of how such a LAN is initialized, defined and maintained are described hereinafter.

As used herein, a collector 116 and the meters 114 with which it communicates may be referred to as "nodes" in the subnet/LAN 120. In each subnet/LAN 120, each meter transmits data related to consumption of the commodity being metered at the meter's location. The collector 116 may receive the data transmitted by each meter 114, effectively "collecting" it, and then periodically transmits the data from the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network (WAN), the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, a TCP/IP network, a W-WAN, a GPRS network, a CDMA network, a Fiber network, or any combination of the above.

Figure 2:
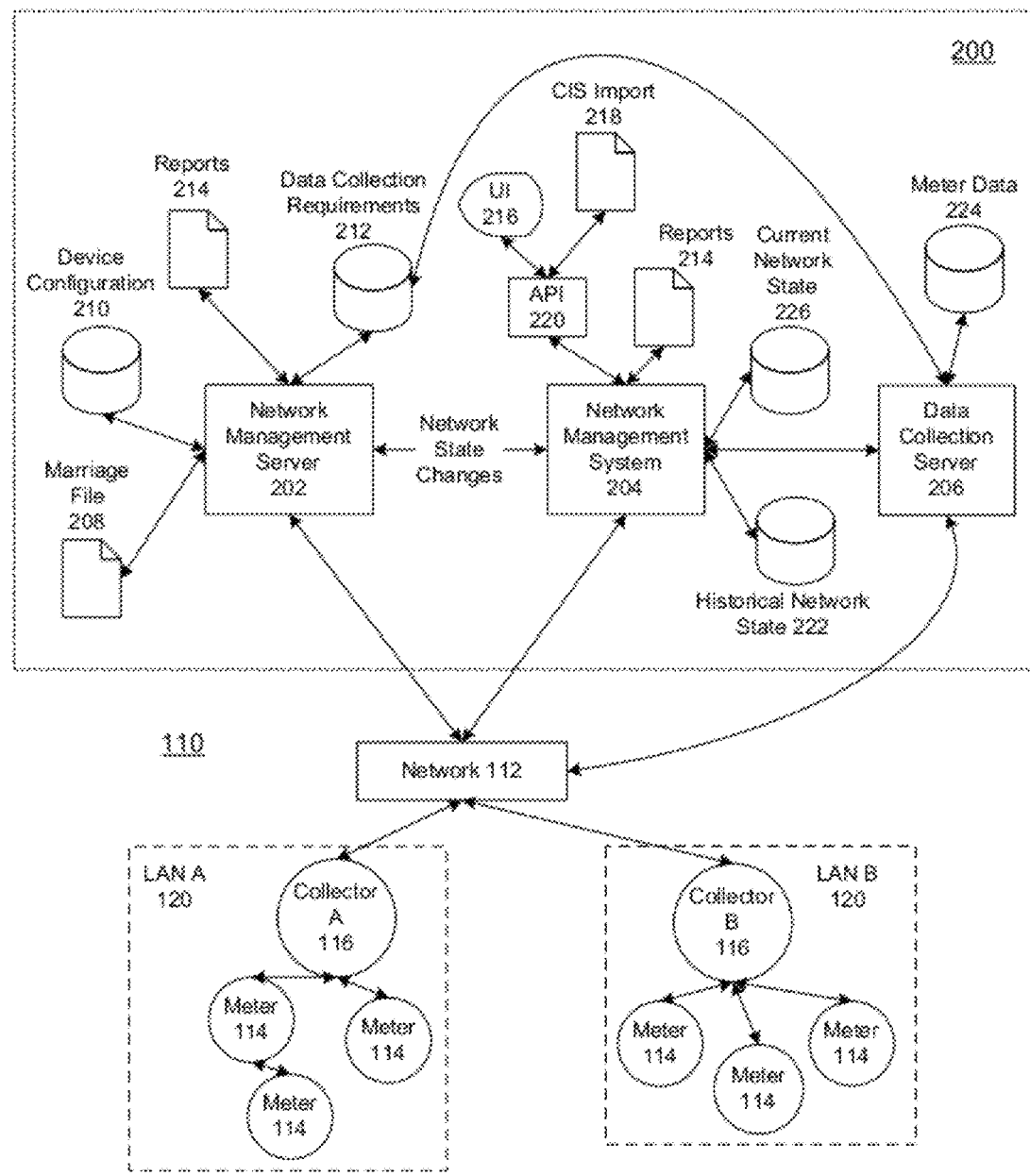
FIG. 2 expands upon the diagram of FIG. 1 and illustrates the exemplary metering communication system in greater detail.

Referring now to FIG. 2, further details of the metering communication system 110 are shown. Typically, the system will be operated by a utility company or a company providing information technology services to a utility company. In FIG. 2, some or all of the components illustrated in dashed-box 200 may be referred to a utility's "operations center," "head-end," or similar name. As shown, the operations center 200 may comprise a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (e.g., the collectors and meters) and the communication system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (e.g., a serial number assigned by the manufacturer of the meter) and the LAN ID for each node in the subnet/LAN 120. In this manner, the utility may refer to the meters and collectors by the utility's identifier, while the system may employ the LAN ID for the purpose of designating particular meters during system communications.

A device configuration database 210 stores configuration information regarding the nodes. For example, in the metering communication system 110, the device configuration database may include data regarding time of use (TOU) switchpoints, etc. for the meters 114 and collectors 116 communicating in the system 110. A data collection requirements database 212 includes information regarding the data to be collected on a per node basis. For example, a utility may specify that metering data such as load profile, demand, TOU, etc. is to be collected from particular meter(s) 114a. Reports 214 including information on the network configuration may be automatically generated or in accordance with a utility request.

The network management system (NMS) 204 may maintain a database describing the current state of the global fixed network system (current network state 226) and a database describing the historical state of the system (historical network state 222). The current network state 226 contains data regarding current meter-to-collector assignments, etc. for each subnet/LAN 120. The historical network state 222 is a database from which the state of the network at a particular point in the past may be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 may collect data from the nodes (e.g., collectors 116) and store the data in a database 224. The data may include metering information, such as energy consumption, and may be used for billing purposes, etc. by a utility provider.

The network management server 202, network management system 204 and data collection server 206 communicate with the nodes in each subnet/LAN 120 via network 112.

Figure 3A:
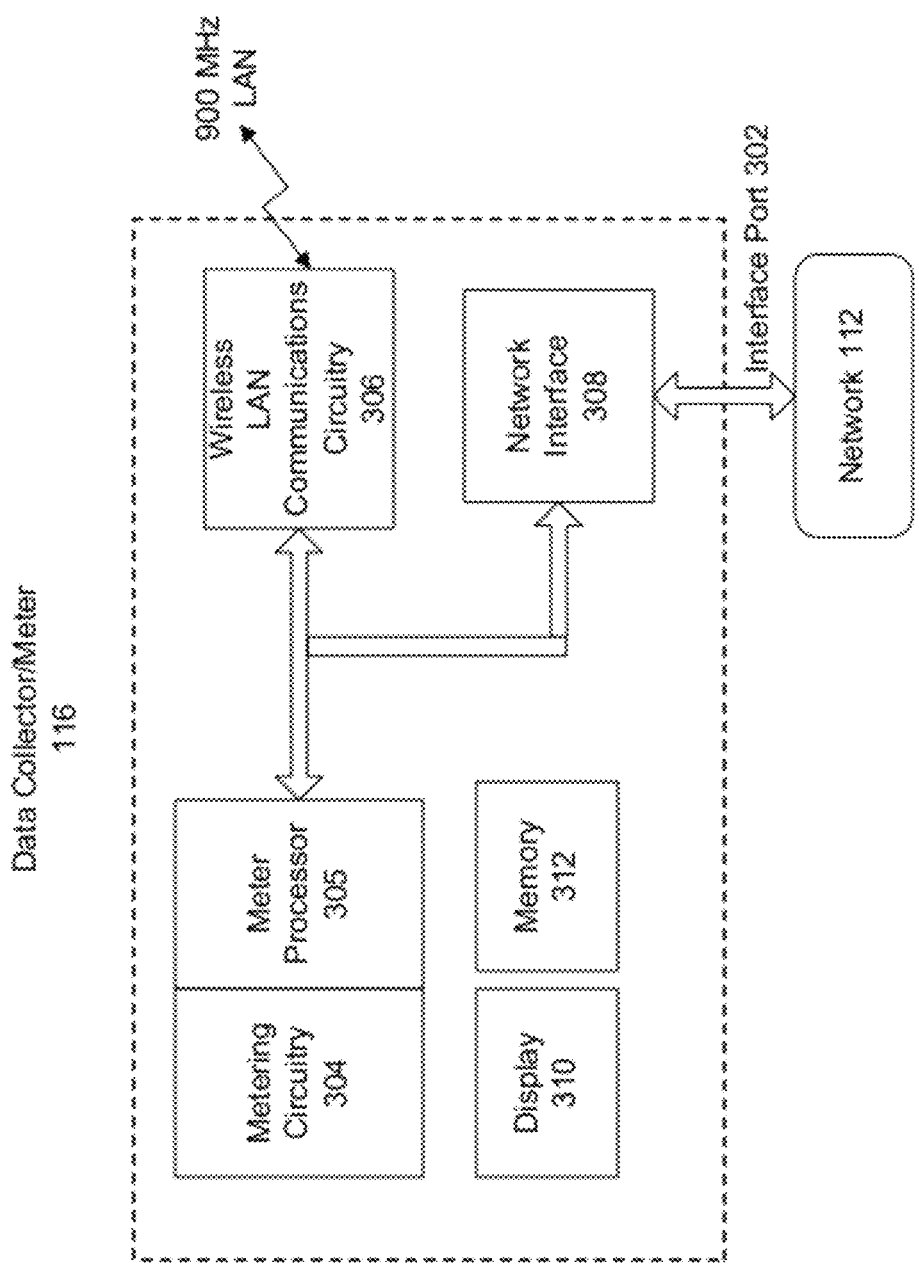
FIG. 3A is a block diagram illustrating an exemplary gatekeeper (also referred to as a "collector") of the metering communication system of FIG. 1.

FIG. 3A is a block diagram illustrating further details of one embodiment of a collector 116. Although certain components are designated and discussed with reference to FIG. 3A, it should be appreciated that such designations and discussion are not limiting. In fact, various other components typically found in an electronic meter may be a part of collector 116, but have not been shown in FIG. 3A for the purposes of clarity and brevity. Also, other components may be used to accomplish the operation of collector 116. The components that are shown and the functionality described for collector 116 are provided as examples, and are not meant to be exclusive of other components or other functionality.

As shown in FIG. 3A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In an embodiment, the metering circuitry 304, processor 305, display 310 and memory 312 may be implemented using an A3 ALPHA meter available from Elster Solutions, LLC. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 may route messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing it's time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and/or the WAN Option Board 308.

The responsibility of a collector 116 is wide and varied. Generally, collector 116 may be responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

In an embodiment, the LAN Option Board 306 may employ a CC1110 chip available from Texas Instruments Incorporated® to implement its wireless transceiver functionality. The CC1110 chip has a built-in Received Signal Strength Indication (RSSI) capability that provides a measurement of the power present in a received radio signal.

Figure 3B:
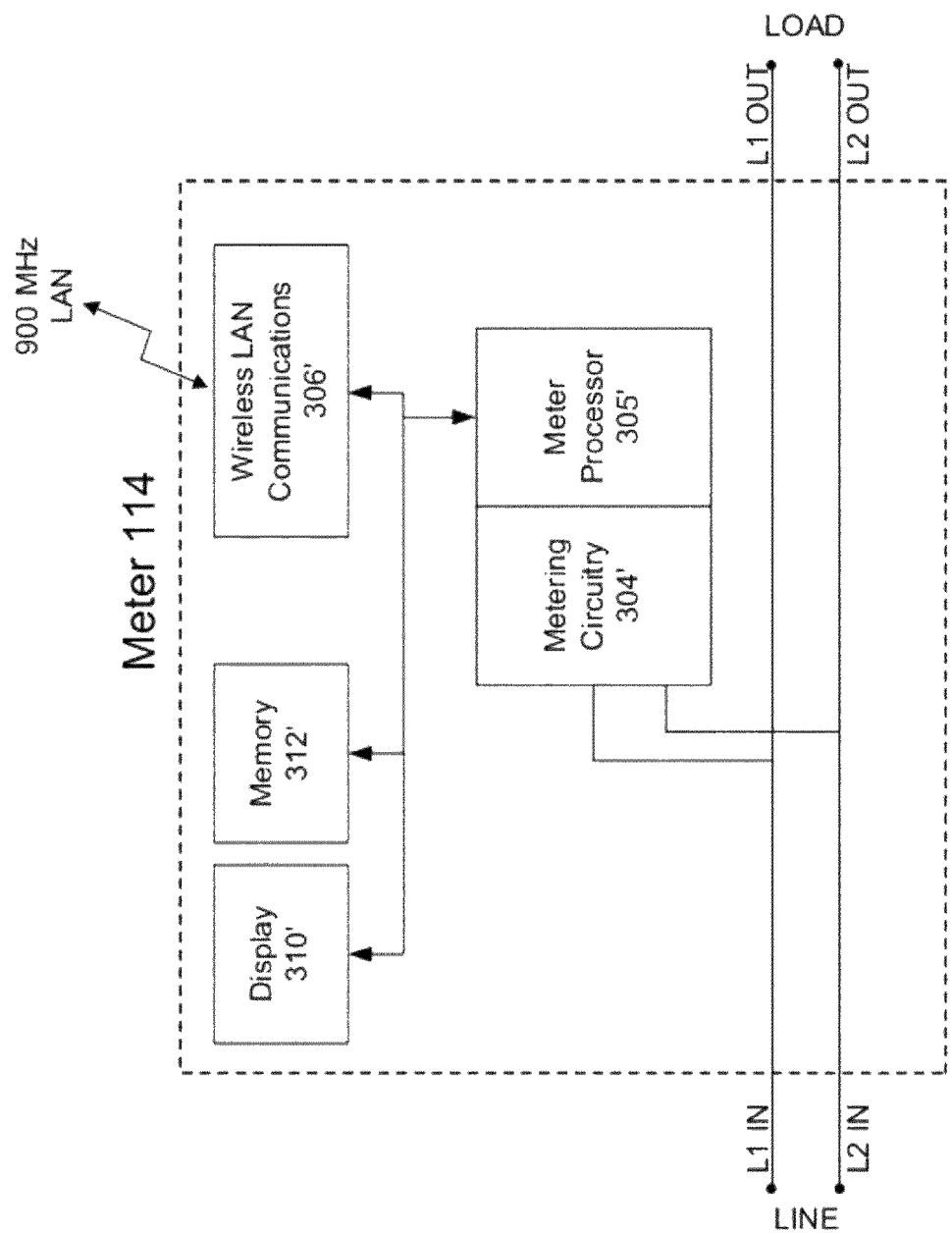
FIG. 3B is a block diagram illustrating an exemplary metering device of the metering communication system of FIG. 1.

FIG. 3B is a block diagram of an exemplary embodiment of a meter 114 that may operate in the system 110 of FIGS. 1 and 2. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306', such as a transceiver, for transmitting and receiving data to/from other meters 114 or a collector 116. The wireless communication circuitry 306' may comprise, for example, the aforementioned CC1110 chip available from Texas Instruments Incorporated®.

Referring again to FIG. 1, in an embodiment, a collector 116 directly communicates with a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a may operate as repeaters for communications between collector 116 and meters 114 located further away in subnet 120.

Each level one meter 114a may be in range to directly communicate with a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While three levels of meters are shown (collector 116, first level 114a, second level 114b) in FIG. 1, a subnet 120 may comprise any number of levels of meters 114. For example, a subnet 120 may comprise one level of meters but might also comprise eight, sixteen, thirty-two or even more levels of meters 114. In an embodiment, as many as 2048 or more meters may be registered with a single collector 116.

As mentioned herein, in an embodiment, each meter 114 and collector 116 that is installed in the system 110 may have a unique identifier (LAN ID) stored thereon that uniquely identifies the device from the other devices in the system 110. Additionally, meters 114 operating in a subnet 120 may comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and/or if the meter operates as a repeater, the identifier that uniquely identifies the repeater within the particular subnet, and the number of meters for which it is a repeater. In one embodiment, collectors 116 have stored thereon this same data for meters 114 that are registered therewith. Thus, collector 116 comprises data identifying the nodes registered therewith as well as data identifying the registered path by which data is communicated from the collector to each such node. Each meter 114 therefore has a designated communications path to the collector that is either a direct path (e.g., all level one nodes) or an indirect path through one or more intermediate nodes that serve as repeaters.

In an embodiment, information is transmitted in the form of packets. For most network tasks such as, for example, reading meter data, collector 116 communicates with meters 114 in the subnet 120 using point-to-point transmissions. For example, a message or instruction from collector 116 may be routed through the designated set of repeaters to the desired meter 114. Similarly, a meter 114 may communicate with collector 116 through the same set of repeaters, but in reverse.

In some instances, however, collector 116 may quickly communicate information to the meters 114 located in its subnet 120. Accordingly, collector 116 may issue a broadcast message that is meant to reach all nodes in the subnet 120. The broadcast message may be referred to as a "flood broadcast message." A flood broadcast may originate at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message may pick a random time slot and communicate the broadcast message to third level meters. This process may continue out until the end nodes of the subnet. Thus, a broadcast message gradually propagates outward from the collector to the nodes of the subnet 120.

The flood broadcast packet header may include information to prevent nodes from repeating the flood broadcast packet more than once per level. For example, within a flood broadcast message, a field might exist that indicates to meters/nodes which receive the message, the level of the subnet the message is located; nodes at that particular level may re-broadcast the message to the next level. If the collector broadcasts a flood message with a level of 1, level 1 nodes may respond. Prior to re-broadcasting the flood message, the level 1 nodes increment the field to 2 so that level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, it may not be possible to rely upon the clocks internal to meters 114 to provide accurate time readings. Having the correct time may be necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages may be used in subnet 120 to transmit unexpected events that occur at meters 114 to collector 116. In an embodiment, the first 4 seconds of every 32-second period may be allocated as an exception window for meters 114 to transmit exception messages. Meters 114 may transmit their exception messages early enough in the exception window so the message has time to propagate to collector 116 before the end of the exception window. Collector 116 may process the exceptions after the 4-second exception window. Generally, a collector 116 acknowledges exception messages, and the collector 116 waits until the end of the exception window to send this acknowledgement.

In an illustrative embodiment, exception messages may be configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the data collection server 206 on a regular schedule.

Exceptions may be processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed herein, collector 116 transmits a command to initiate a scan procedure to the meter 114 from which the exception was received.

If an immediate exception type has been received, collector 116 may make a record of the exception. An immediate exception might identify, for example, that there has been a power outage. Collector 116 may log the receipt of the exception in one or more tables or files. In an illustrative example, a record of receipt of an immediate exception is made in a table which may be referred to as the "Immediate Exception Log Table." Collector 116 may then wait a set period of time before taking further action with respect to the immediate exception. For example, collector 116 may wait 64 seconds. This delay period may allow the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 may communicate the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes for example. This may be to avoid reporting exceptions from other meters 114 that relate to, or have the same cause as, the exception that was just reported.

If a daily exception was received, the exception may be recorded in a file or a database table. Generally, daily exceptions are occurrences in the subnet 120 that may be reported to data collection server 206, but are not so urgent that they may be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 may communicate the daily exceptions once every 24 hours.

In an embodiment, a collector may assign designated communications paths to meters with bi-directional communication capability, and may change the communication paths for previously registered meters if conditions warrant. For example, when a collector 116 is initially brought into system 110, it may identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "single node scan."

A full node scan may be performed, for example, when a collector is first installed. The collector 116 identifies and registers nodes from which it will collect usage data. The collector 116 may initiate a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore may be detected at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (e.g., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry may include the meter's LAN ID, its qualification score (e.g., 5 out of 10; or its RSSI value), its level (in this case level one) and/or the unique ID of its parent (in this case the collector's ID).

If the qualification threshold is met or exceeded, the collector 116 may register the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 may forward to meter 114 an indication that it is registered, the unique identifier of the collector with which it is registered, the level the meter exists at in the subnet, and/or the unique identifier of its parent meter that may serve as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process may continue by performing a similar process as that described above at each of the now registered level one nodes. This process may result in the identification and registration of level two nodes. After the level two nodes are identified, a similar node scan process may be performed at the level two nodes to identify level three nodes, and so on.

Specifically, to identify and register meters that may become level two meters, for each level one meter, in succession, the collector 116 transmits a command to the level one meter, which may be referred to as an "Initiate Node Scan Procedure" command. This command instructs the level one meter to perform its own node scan process. The request may comprise several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Procedure request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request may wait for and receive responses from unregistered nodes. For each response, the meter may store in memory the unique identifier of the responding meter. This information is then transmitted to the collector.

For each unregistered meter that responded to the node scan issued by the level one meter, the collector attempts again to determine the reliability of the communication path to that meter. In one embodiment, the collector may send a "Qualify Nodes Procedure" command to the level one node which may instruct the level one node to transmit a predetermined number of additional packets to the potential level two node and to record the number of acknowledgements received back from the potential level two node. This qualification score (e.g., 8 out of 10) may then be transmitted back to the collector, which may again compare the score to a qualification threshold. In other embodiments, other measures of the communications reliability may be provided, such as an RSSI value.

If the qualification threshold is not met, then the collector may add an entry for the node in the Straggler Table, as discussed above. However, if there already is an entry in the Straggler Table for the node, the collector may update that entry if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information may be updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the Initiate Node Scan Procedure request may be updated to identify that it operates as a repeater and, if it was previously registered as a repeater, increments a data item identifying the number of nodes for which it serves as a repeater. Thereafter, collector 116 may forward to the newly registered meter an indication that it is registered, an identification of the collector 116 with which it is registered, the level the meter exists at in the subnet, and/or the unique identifier of the node that will serve as its parent, or repeater, when it communicates with the collector 116.

The collector may then perform the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector may then send the Initiate Node Scan Procedure request to each level two node, in turn. Each level two node will then perform the same node scan procedure as performed by the level one nodes, potentially resulting in the registration of a number of level three nodes. The process may then be performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop." For example, if an unregistered node responds to a node scan request from a level four node, and therefore, becomes a potential level five node, the qualification score for that node may be based on the reliability of communications between the level four node and the potential level five node (e.g., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (e.g., level one nodes) or an indirect path through one or more intermediate nodes that serve as repeaters. If during operation of the network, a meter registered in this manner fails to perform adequately, it may be assigned a different path or possibly to a different collector as described herein.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "single node scan." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a single node scan of a meter 114 when during the course of a full node scan the collector 116 was unable to read the node scan data from the meter 114. Similarly, a single node scan may be performed when an exception procedure requesting an immediate node scan is received from a meter 114.

The system 110 may automatically reconfigure to accommodate a new meter 114 that may be added. More particularly, the system may identify that the new meter has begun operating and identifies a path to a collector 116 that will become responsible for collecting the metering data. Specifically, the new meter may broadcast an indication that it is unregistered. In one embodiment, this broadcast might be, for example, embedded in, or relayed as part of a request for an update of the real time as described above. The broadcast may be received at one of the registered meters 114 in proximity to the meter that is attempting to register. The registered meter 114 forwards the time to the meter that is attempting to register. The registered node may also transmit an exception request to its collector 116 requesting that the collector 116 implement a node scan, which presumably will locate and register the new meter. The collector 116 may then transmit a request that the registered node perform a node scan. The registered node may perform the node scan, during which it requests that the unregistered nodes respond. Presumably, the newly added, unregistered meter will respond to the node scan. When it does, the collector may then attempt to qualify and then register the new node in the same manner as described above.

Once a communication path between the collector and a meter is established, the meter can begin transmitting its meter data to the collector and the collector can transmit data and instructions to the meter. Data transmission between a collector and the meters in its subnet are, in one embodiment, performed in accordance with the following communications protocol. In this protocol, data is transmitted in packets. "Outbound" packets are packets transmitted from the collector to a meter at a given level. In an embodiment, as illustrated in FIG. 3C, outbound packets include the following fields, but other fields may also be included:

Length—the length of the packet;
SrcAddr—source address—in this case, the LAN ID of the collector;
DestAddr—the LAN ID of the meter to which the packet is addressed;
RptPath—the communication path to the destination meter (i.e., the list of identifiers of each repeater in the path from the collector to the destination node); and
Data—the payload of the packet.

The packet may also include integrity check information (e.g., CRC), a pad to fill-out unused portions of the packet and other control information. When the packet is transmitted from the collector, it may be forwarded on to the destination meter by those repeater meters whose identifiers appear in the RptPath field. Other meters may receive the packet, but meters that are not listed in the path identified in the RptPath field may not repeat the packet.

"Inbound" packets are packets transmitted from a meter at a given level to the collector. In one embodiment, as illustrated in FIG. 3D, inbound packets include the following fields, but other fields may also be included:

Length—the length of the packet;
SrcAddr—source address—the LAN ID of the meter that initiated the packet;
DestAddr—the LAN ID of the collector to which the packet is to be transmitted;
RptAddr—an identifier of the parent node that serves as the next repeater for the sending node;
Data—the payload of the packet;

Because each meter knows the identifier of its parent node (e.g., the node in the next lower level that serves as a repeater for the present node), an inbound packet may identify who is the next parent. When a node receives an inbound packet, it may check to see if the RptAddr matches its own identifier. If not, it discards the packet. If so, it knows that it is supposed to forward the packet on toward the collector. The node may then replace the RptAddr field with the identifier of its own parent and transmit the packet so that its parent will receive it. This process may continue through each repeater at each successive level until the packet reaches the collector.

For example, suppose a meter at level three initiates transmission of a packet destined for its collector. The level three node may insert in the RptAddr field of the inbound packet the identifier of the level two node that serves as a repeater for the level three node. The level three node may then transmit the packet. Several level two nodes may receive the packet, but the level two node having an identifier that matches the identifier in the RptAddr field of the packet may be the one to acknowledge it. The others may discard it. When the level two node with the matching identifier receives the packet, it may replace the RptAddr field of the packet with the identifier of the level one node that serves as a repeater for that level two node, and the level two node may then transmit the packet. This time, the level one node having the identifier that matches the RptAddr field may receive the packet. The level one node may insert the identifier of the collector in the RptAddr field and may transmit the packet. The collector may then receive the packet to complete the transmission.

A collector 116 may periodically retrieve meter data from the meters that are registered with it. For example, meter data may be retrieved from a meter every 4 hours. Where there is a problem with reading the meter data on the regularly scheduled interval, the collector may try to read the data again before the next regularly scheduled interval. Nevertheless, there may be instances wherein the collector 116 is unable to read metering data from a particular meter 114 for a prolonged period of time. The meters 114 may store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 may transmit a message to the meter 114 to respond to node scans going forward. The meter 114 may remain registered but will respond to node scans in the same manner as an unregistered node as described above. In other embodiments, the registered meters may be permitted to respond to node scans, but a meter may respond to a node scan if the path to the collector through the meter that issued the node scan is shorter (i.e., less hops) than the meter's current path to the collector. A lesser number of hops is assumed to provide a more reliable communication path than a longer path. A node scan request may identify the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path may be rejected. However, if the RSSI threshold is met, the collector 116 will request that the node that issued the node scan perform the qualification process described herein (e.g., send a predetermined number of packets to the node and count the number of acknowledgements received). If the resulting qualification score satisfies a threshold, then the collector may register the node with the new path. The registration process comprises updating the collector 116 and meter 114 with data identifying the new repeater (e.g., the node that issued the node scan) with which the updated node may now communicate. Additionally, if the repeater has not previously performed the operation of a repeater, the repeater may need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, the qualification of the last "hop" (e.g., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 may not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 may not respond to the node scan.

If it is determined that the path to the new collector may be better than the path to its existing collector, the meter 114 may respond to the node scan. Included in the response is information regarding any nodes for which the particular meter may operate as a repeater. For example, the response might identify the number of nodes for which the meter serves as a repeater.

The collector 116 may then determine if it has the capacity to service the meter and any meters for which it operates as a repeater. If not, the collector 116 may not respond to the meter that is attempting to change collectors. If, however, the collector 116 determines that it has capacity to service the meter 114, the collector 116 stores registration information about the meter 114. The collector 116 may then transmit a registration command to meter 114. The meter 114 updates its registration data to identify that it is now registered with the new collector. The collector 116 may then communicate instructions to the meter 114 to initiate a node scan request. Nodes that are unregistered, or that had previously used meter 114 as a repeater respond to the request to identify themselves to collector 116. The collector may register these nodes as is described herein in connection with registering new meters/nodes.

Under some circumstances it may be desirable to change a collector. For example, a collector may be malfunctioning and may be taken off-line. Accordingly, a new communication path may be provided for collecting meter data from the meters serviced by the particular collector. The process of replacing a collector is performed by broadcasting a message to unregister, usually from a replacement collector, to the meters that are registered with the collector that is being removed from service. In one embodiment, registered meters may be programmed to respond to commands from the collector with which they are registered. Accordingly, the command to unregister may comprise the unique identifier of the collector that is being replaced. In response to the command to unregister, the meters begin to operate as unregistered meters and respond to node scan requests. To allow the command to unregister to propagate through the subnet, when a node receives the command it may not unregister immediately, but rather remain registered for a defined period, which may be referred to as the "Time to Live". During this time to live period, the nodes continue to respond to application layer and immediate retries allowing the unregister command to propagate to all nodes in the subnet. Ultimately, the meters register with the replacement collector using the procedure described above.

One of the collector's 116 main responsibilities within subnet 120 is to retrieve metering data from meters 114. In one embodiment, collector 116 has as a goal to obtain at least one successful read of the metering data per day from each node in its subnet. Collector 116 may attempt to retrieve the data from the nodes in its subnet 120 at a configurable periodicity. For example, collector 116 may be configured to attempt to retrieve metering data from meters 114 in its subnet 120 once every 4 hours. In greater detail, in one embodiment, the data collection process may begin with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing may continue. However, if the meters 114 in subnet 120 have been read, the collector waits a defined length of time, such as, for example, 4 hours, before attempting another read.

If during a read of a particular meter, the meter data is not received at collector 116, the collector 116 may begin a retry procedure wherein it attempts to retry the data read from the particular meter. Collector 116 may continue to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

In an embodiment, data collected and stored in the meters 114 of the system 110 of FIGS. 1, 2, 3A and 3B is organized and extracted from each meter 114 in accordance with American National Standards Institute (ANSI) standard C12.19. The ANSI C12.19 standard defines a table structure for utility application data to be passed between an end device, such as a meter 114, and a computer, such as the Network Management Server 204 of FIG. 2. The purpose of the tables is to define structures for transporting data to and from end devices. C12.19 defines both a "standard table" structure and a "manufacturers table" structure. In this embodiment, the Network Management Server 204 includes a set of commands for reading data from, and writing data to, one or more C12.19 tables in an end device, such as a meter 114. Those commands may be transmitted to a meter 114 or other node in accordance with the wireless networking protocol described above.

The metering communication devices described herein, such as meters 114 for example, may be used for test purposes and/or production purposes. Described below are various techniques (methods, systems and/or apparatus) that enable a metering communication device to support metering accuracy tests. For example, a metering communication device in a utility network may be able to change a network identifier from an active utility identifier to a production identifier or a test identifier. According to another example, a metering communication device in a utility network may be configured to perform metering accuracy tests when the metering communication device is transmitting.

Utilities may desire to isolate a production system from a test system and may also desire to move devices between a test system and a production system. A production system may refer to a system that monitors consumption for billing purposes or the like. A test system may refer to a system that tests and evaluates device and/or system functionality, for example. As described herein, devices in a communication system, such as a production system or a test system, may be assigned a common utility identifier, for example, in order to communicate within the system. A utility identifier may also be referred to as a network identifier. Each network identifier may correspond to a metering network. For example, the devices in the communication system may include a collector 116 and/or meter 114 as described herein. Metering communication devices, for example, may communicate with other devices that have a matching network identifier. These network identifiers may be set in a secure manner for security reasons.

According to an exemplary embodiment, described herein is a means for a utility or other network manager to change the network identifier, such as the utility identifier for example, from an active (or current) utility identifier to a production utility identifier or a test utility identifier. The active utility identifier may refer to a current network identifier assigned to the device, and the active utility identifier may be a production utility identifier or a test utility identifier. A list of valid identifiers may be included in a configuration table in the communication device. The configuration table, such as a utility identification (ID) configuration table, may be stored in a memory of a metering communication device. Each device may be assigned a valid identifier and this valid identifier may be loaded as part of the communication module's configuration in a local area network (LAN) configuration table. The communication module may be implemented as a transceiver by wireless communications circuitry 306' in FIG. 3B, and may use the valid utility identifier to accept and process messages that include a utility identifier that matches what is programmed in the LAN configuration table.

According to an embodiment, a radio module, such as wireless communications circuitry 306' for example, may operate from one valid utility identifier at a time. There may be a utility configuration table that includes a list of valid utility identifiers associated with a metering communication device 114. This configuration table, which may be referred to as the utility ID configuration table or the utility configuration table, may be stored in the memory 312' and may be loaded at time of manufacture using security permissions that may be specific to the manufacturing process. In some embodiments, the utility configuration table may not be changed after the meter 114 is manufactured at a factory.

A utility configuration table may include a list of valid utility identifiers associated with a metering communication device. For example, one utility identifier in the list may be a production utility identifier. In some embodiments, the production utility identifier may be the first identifier in the list. Other utility identifiers in the list of valid utility identifiers may include valid test utility identifiers that are assigned to the device. The production utility identifier or a test utility identifier may match the active utility identifier. The active utility identifier may be previously programmed into a device. The utility ID configuration table may include entries for any number of valid utility identifiers. According to an example embodiment, the utility ID configuration table may include entries for eight valid utility identifiers. The number of entries may be increased and/or decreased without limitation.

According to an exemplary embodiment, when a communication device such as a metering communication device leaves the factory after manufacture, the device's LAN configuration table may include the active utility identifier. The active utility identifier may match the production identifier of a customer's communication (or metering) network. An entry, such as the first entry for example, in the utility configuration table may be programmed to match this production utility identifier. The remaining entries in the utility ID configuration table may include valid test utility identifiers. The test utility identifier entries may not need to be populated. If an entry is not used, it may be set to an invalid utility identifier. For example, an entry may be set to zero if the entry is not used.

Figure 4:
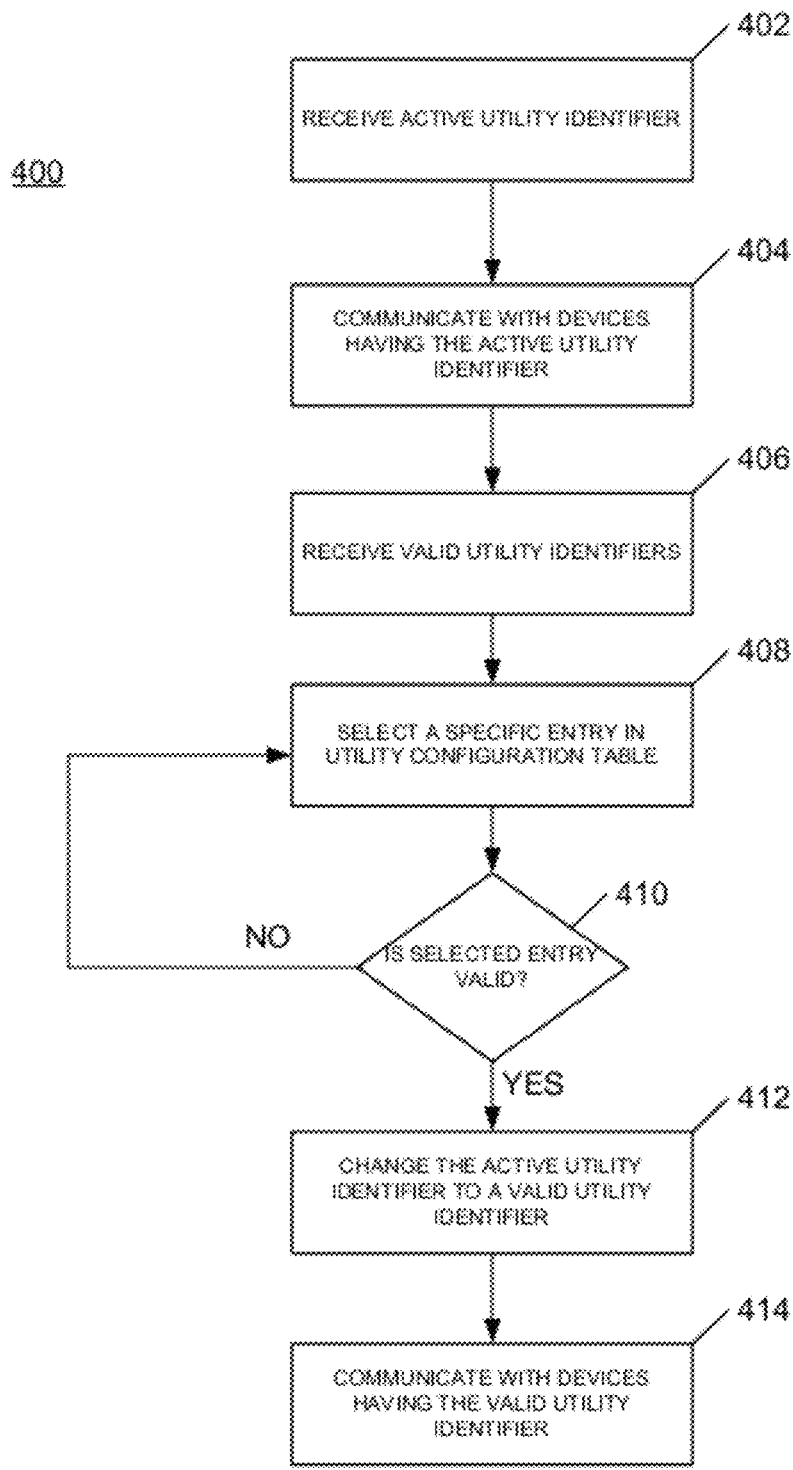
FIG. 4 is a process flow diagram illustrating an example method for programming and operating a metering communication device according to an embodiment.

In some embodiments, customers or users of a metering communication device may not have access to directly write entries into the LAN configuration table and/or the utility ID configuration table. In some embodiments, a metering communication device may support a function that provides a mechanism for the metering communication device to change from one active utility identifier to another valid utility identifier. The function may be referred to as a change utility ID function. For example, FIG. 4 illustrates an exemplary programming and operating method 400 according to embodiments in which the active utility identifier of a metering communication device may be changed. The programming method 400 may be implemented by a software tool, hardware, or any combination thereof.

As illustrated in FIG. 4, at step 402, an active utility identifier of a metering communication device may be received by the metering communication device. For example, the metering communication device may retrieve the active utility identifier from a LAN configuration table stored in the memory of the device. In some embodiments, the active utility identifier may be reported, via a software tool or the display 310' or the like, to a user or operator of the device. The active utility identifier may correspond to a metering network. For example, as shown in at 404, the metering communication device may communicate with one or more devices in a network having the active utility identifier. At step 406, the metering communication device may receive a list of one or more valid utility identifiers that are associated with the metering communication device. For example, the metering communication device may retrieve the valid utility identifiers from a utility configuration table stored in the memory of the device. In some embodiments, the valid utility identifiers may be reported, via a software tool or the display 310' or the like, to a user or operator of the device. In certain embodiments, the first utility identifier read from the utility ID configuration table, which may be the first entry in the table for example, may be marked as the production utility identifier.

At step 408, some embodiments may allow a user or device operator to select a specific entry in the utility configuration table. After a specific entry is selected, the communication device may verify that the specific entry is valid at step 410. The communication device may respond to the select function by verifying that the selected entry includes a valid utility identifier, such as a non-zero utility identifier for example. If the entry includes a valid utility identifier, the process may proceed to step 412 where the device's active utility identifier is changed to a valid utility identifier from the list of valid utility identifiers. For example, the metering communication device may internally copy the referenced utility identifier from the utility ID configuration table to the LAN configuration table at 412. In an embodiment, after changing the active utility identifier, the device may have an active utility identifier corresponding to another metering network that was selected by the user. For example, the active utility identifier may change from a production utility identifier to a test utility identifier for communicating in a test network or from a test utility identifier to another test utility identifier for communicating in another test network. At step 414, the metering communication device may communicate with other devices having the valid utility identifier corresponding to the other metering network. In some embodiments, the contents of the utility ID configuration table may be unchanged during the programming method 400 and during the operation of the metering communication device. In an embodiment, the active utility identifier field in the LAN configuration table may change during the exemplary programming and operating method 400, but the remainder of the LAN configuration table may remain unchanged.

The exemplary programming and operating method may be implemented by a variety of metering communication devices, such as the meter 114 shown in FIG. 3B. For example, the meter processor 305' may be configured to execute processor-executable instructions to control the meter 114. The memory 312' may be configured to store a variety of data such as processor-executable instructions, a LAN configuration table, and a utility configuration table. A transceiver, such as the wireless communications circuitry 306', may be configured to transmit and receive radio signals in one or more metering networks. The metering network which the transceiver communicates with may depend on the active utility identifier of the meter 114. The processor 305' may be configured to change the active utility identifier of the meter 114 to a valid utility identifier from a list of one or more valid utility identifiers associated with the meter 114. According to an example embodiment, each valid utility identifier in the list of identifiers may correspond to a different network in which the metering device may be implemented. Therefore, the meter 114 may be configured to operate in a variety of metering networks including production networks and test networks. In some embodiments, the wireless communications circuitry 306' may be configured to operate in one or more test modes while the processor 305' performs one or more meter accuracy tests on the meter 114.

In some embodiments, production utility identifiers may be set such that neighboring utilities, communicating using other networks, have unique identifiers, thereby isolating production networks from interfering with one another for example. Test utility identifiers may also be assigned such that neighboring utilities, communicating using other networks, have dissimilar test identifiers. The utility identifier mechanism may provide flexibility in that a list of identifiers may be set specifically for a given customer. The allowed (e.g., valid) utility identifiers may be restricted to a list that may be uniquely defined for each customer. The mechanism to limit the allowed utility identifiers to a specific list may provide a level of security, for example, that prevents a device from being changed to communicate (e.g., interfere) with a different utility's production network.

According to an embodiment, metering communication devices may be programmed with a factory encryption key. The key may be assigned based on a customer identification number, which may be referred to as a CustId for example. The CustId may be unique for each customer. Devices may be shipped with this unique factory encryption key, such as a 128-bit unique number for example. This factory key may be used to change a device to a utility specified key. This utility specified key may be periodically changed. Devices shipped to a given customer may be shipped with different CustIds, and the different CustIds may be used to differentiate between a production and test utility identifier. For example, the CustID "Cust1_Production" may refer to a production key for the utility identified with number 1, and the CustID "Cust1_Test" may refer to a test key for the utility identified with number 1.

As described above, a customer may use a different CustId to order devices for their production system than the customer uses to order devices for a test system. Although production CustIds and test CustIds may be different with respect to a common customer, the production device factory encryption keys may be different or the same as test device factory encryption keys. Devices, such as those used in a production system or one of many test systems for example, may be shipped using the same CustId and/or the same factory encryption key, thereby simplifying the key management and order entry processes.

According to embodiments, metering test modes may be combined with radio test modes into one function. This combination may allow the impact of radio modes to be evaluated during metering accuracy tests. Metering tests may be performed by selecting a metering quantity, such as kWh delivered and/or received, kVAh delivered and/or received, and/or kVARh delivered and/or received for example. Metering tests may configure the meter under test to output test pulses, such as via an optical port and/or a separate test LED for example. The test pulses may be in proportion to the amount of energy seen by the meter. These test pulses may be counted and compared to the amount of energy measured by a test standard and/or the comparison of the standard to the meter results in a metering accuracy number. The capability to configure and/or select a test output may be combined with the ability to put the communication module (e.g., such as the wireless communication circuitry 306's shown in FIG. 3B) in the meter under test in a radio test mode, while the metering accuracy tests are being performed.

Radio test modes may control a variety of radio test parameters of a metering communication device. For example, a user may select to enable or disable the radio during a test. A test may be conducted in which the radio constantly transmits a modulated signal or an unmodulated signal. For example, an unmodulated test signal may have a constant carrier at the center frequency of the channel. Exemplary radio test parameters may also include a constant receive mode in which the transceiver stays in receive mode and the transceiver does not transmit. In an embodiment, a radio test parameter may allow a user to select a delay between packet transmissions. For example, the transmit duty cycle may be specified from a value near zero percent to a value of 100% (e.g., constant transmission). Another exemplary radio test may allow specific channels to be tested. For example, a list of channels may be provided for a device that uses frequency hopping spread spectrum communications.

The above test mode parameters may be representative of various test modes that may be used by radio devices and/or other test modes or parameters may be added.

According to embodiments, the metering test mode parameters may be combined with the radio test mode parameters into a single function that may be executed against a metering communication device. For example, the meter may receive a function with parameters to separately control the metering test mode state; metering test mode parameters, which may be used if the metering test mode is selected for example; the radio test mode state; and/or radio test mode parameters, which may be used if the radio test mode is selected for example.

The combination of the test modes may allow many combinations of tests. Examples of types of tests that may be performed using the combination of test modes may include, but are not limited to: metering accuracy tests with radio disabled; metering accuracy tests with radio in receive mode; metering accuracy tests with radio transmitting 100% of the time; and/or metering accuracy tests with radio transmitting at various duty cycles (e.g., 10% to 100%).

All or portions of the methods and apparatus described above may be embodied in hardware, software, or a combination of both. When embodied in software, the methods and apparatus of the present invention, or certain aspects or portions thereof, may be embodied in the form of program code (e.g., computer-executable instructions or processor-executable instructions). This program code may be stored on a computer-readable medium or a processor-readable medium, such as a magnetic, electrical, or optical storage medium, including without limitation, a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A device on which the program code executes, such as meter 114 and/or collector 116 will generally include a processor, a storage medium readable by the processor (including volatile and non-volatile memory and/or storage elements), at least one input device, and at least one output device. The program code may be implemented in a high level procedural or object oriented programming language. Alternatively, the program code may be implemented in an assembly or machine language. In any case, the language may be a compiled or interpreted language. When implemented on a general-purpose processor, the program code may combine with the processor to provide a unique apparatus that operates analogously to specific logic circuits.

While systems and methods have been described and illustrated with reference to specific embodiments, those skilled in the art will recognize that modifications and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network. Also, while the exemplary metering system described above is a fixed network, the present invention can also be employed in mobile (walk by/drive by) systems. Accordingly, reference should be made to the following claims as describing the scope of the present invention.

What is claimed is:

1. At a metering communication device, a method for operating in a production system and a test system, the method comprising:
   receiving an active utility identifier of the metering communication device, the active utility identifier corresponding to a first metering network that is part of one of the production system or the test system;
   communicating, using the active utility identifier, with one or more devices residing on the first metering network having the active utility identifier;
   receiving a selection of an entry in a utility configuration table that includes one or more valid utility identifiers associated with the metering communication device that enable the metering communication device to communicate on a second metering network that is part of the other one of the production system or the test system;
   determining whether the entry includes one of the one or more valid utility identifiers associated with the metering communication device;
   if the entry includes one of the one or more valid utility identifiers, changing the active utility identifier of the metering communication device to the respective valid utility identifier of the one or more valid utility identifiers; and
   communicating, using the valid utility identifier, with one or more other devices on the second metering network having the valid utility identifier.

2. The method of claim 1, wherein changing the active utility identifier of the metering communication device comprises:
   copying the entry in the utility configuration table to an active utility identifier field in a local area network (LAN) configuration table.

3. The method of claim 1, wherein the active utility identifier is received from a local area network (LAN) configuration table, and wherein the one more valid utility identifiers is received from a utility configuration table.

4. The method of claim 1, wherein:
the first metering network comprises a production metering network;
the valid utility identifier comprises a test utility identifier used for communicating in a test metering network; and
the second metering network comprises the test metering network.

5. The method of claim 1, wherein:
the first metering network comprises a test metering network;
the valid utility identifier comprises a production utility identifier used for communicating in a production metering network; and
the second metering network comprises the production metering network.

6. The method of claim 1, wherein the valid utility identifier comprises a test utility identifier, the method further comprising:
operating the metering communication device in one or more radio test modes; and
while operating the metering communication device in the one or more radio test modes, performing one or more metering accuracy tests on the metering communication device.

7. The method of claim 6, wherein operating the metering communication device in one or more radio test modes comprises at least one of:
disabling radio communications in the metering communication device;
transmitting a modulated signal;
transmitting an unmodulated signal;
operating the metering communication device in a constant receive mode; or
transmitting a test signal at a selected duty cycle.

8. The method of claim 6, wherein performing one or more accuracy tests comprises:
measuring a quantity;
outputting one or more test pulses, the one or more test pulses being proportional to the quantity; and
comparing the one or more test pulses to a test standard.

9. A metering communication device comprising:
a transceiver configured to transmit an active utility identifier to a plurality of metering networks;
a memory configured to store the active utility identifier for communicating in an active metering network of the plurality of metering networks, the active metering network being part of one of a production system or a test system, wherein the memory is further configured to store one or more valid utility identifiers in a utility configuration table for communicating in a second metering network of the plurality of metering networks, the second metering network being part of the other one of the production system or the test system; and
a processor configured to:
receive a selection of an entry in a utility configuration table that includes one or more valid utility identifiers associated with the metering communication device that enable the metering communication device to communicate on the second metering network;
determine whether the entry includes one of the one or more valid utility identifiers associated with the metering communication device; and
if the entry includes one of the one or more valid utility identifiers, change the active utility identifier of the metering communication device to a valid utility identifier of the one or more valid utility identifiers associated with the metering communication device to enable the metering communication device to communicate with the second metering network of the plurality of metering networks.

10. The metering communication device of claim 9, wherein the active utility identifier comprises a production utility identifier, and wherein the one or more valid utility identifiers comprise test utility identifiers.

11. The metering communication device of claim 9, wherein the transceiver is further configured to communicate with one or more other devices in the plurality of metering networks, each of the other devices having a utility identifier equivalent to the active utility identifier of the metering communication device.

12. The metering communication device of claim 9, wherein the active utility identifier comprises a first test utility identifier, and the valid utility identifier comprises one of a second test utility identifier or a production utility identifier.

13. The metering communication device of claim 9, wherein the processor is further configured to:
copy the entry in the utility configuration table to an active utility identifier field in a LAN configuration table stored in the memory.

14. The metering communication device of claim 9, wherein the transceiver is further configured to operate in one or more radio test modes, and the processor is further configured to, while the transceiver operates in the one or more radio test modes, perform one or more metering accuracy tests on the metering communication device.

15. The metering communication device of claim 14, wherein the transceiver is further configured to:
disable radio communications in the metering communication device;
transmit a modulated signal;
transmit an unmodulated signal;
operate the metering communication device in a constant receive mode; or
transmit a test signal at a selected duty cycle.

16. The metering communication device of claim 14, wherein, while the transceiver operates in the one or more radio test modes, the processor is further configured to:
measure a quantity;
output one or more test pulses, the one or more test pulses being proportional to the quantity; and
compare the one or more test pulses to a test standard.

17. A non-transitory computer-readable storage medium having computer-executable instructions stored thereon for performing the steps of:
receiving an active utility identifier of a metering communication device, the active utility identifier corresponding to a first metering network that is part of one of a production system or a test system;
communicating, using the active utility identifier, with one or more devices residing on the first metering network having the active utility identifier;
receiving a selection of an entry in a utility configuration table that includes one or more valid utility identifiers associated with the metering communication device that enable the metering communication device to communicate on a second metering network that is part of the other one of the production system or the test system;
determining whether the entry includes one of the one or more valid utility identifiers associated with the metering communication device;
if the entry includes one of the one or more valid utility identifiers, changing the active utility identifier of the metering communication device to the respective valid utility identifier of the one or more valid utility identifiers; and communicating, using the valid utility identifier, with one or more other devices on the second metering network having the valid utility identifier.

18. The computer-readable storage medium of claim 17, wherein the active utility identifier comprises a production utility identifier, and wherein the one or more valid utility identifiers comprise test utility identifiers.

* * * * *